March 12, 1929.  E. ERMOLD  1,705,047
AUTOMATIC OVERLOAD CLUTCH
Filed April 2, 1927   2 Sheets-Sheet 1
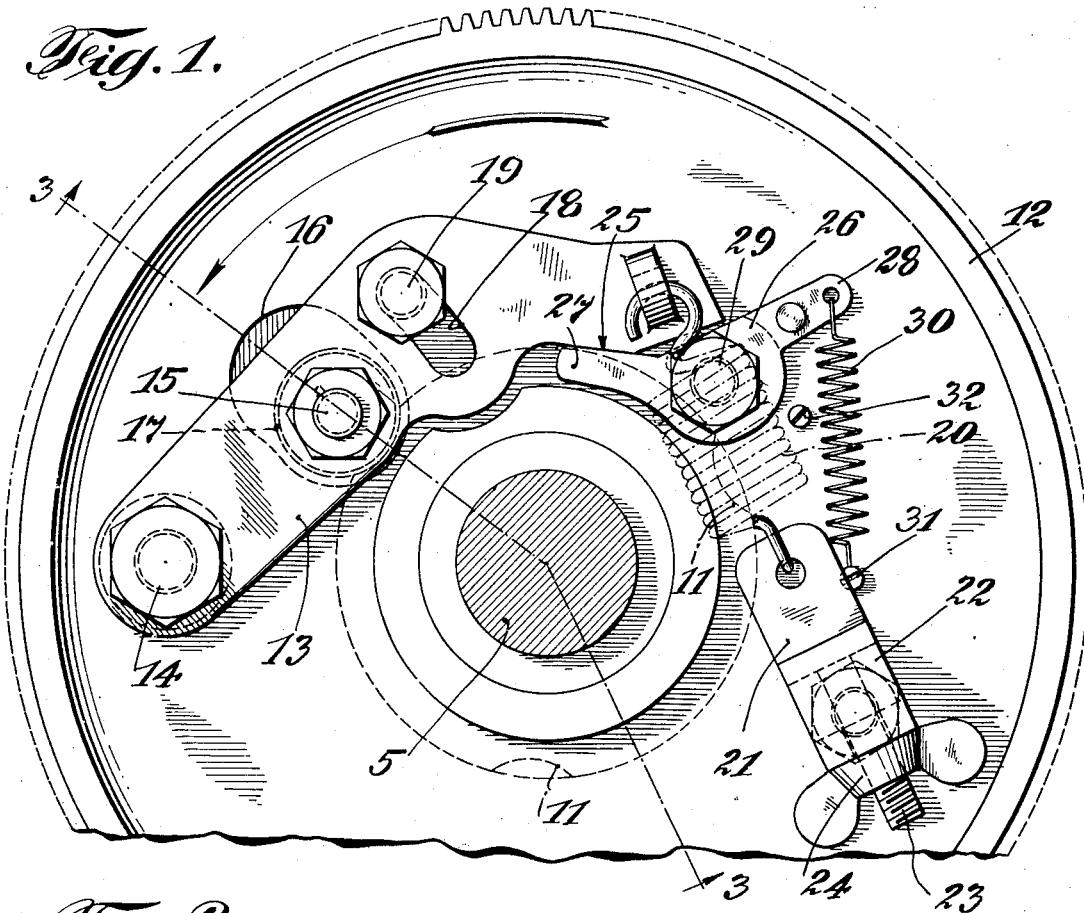
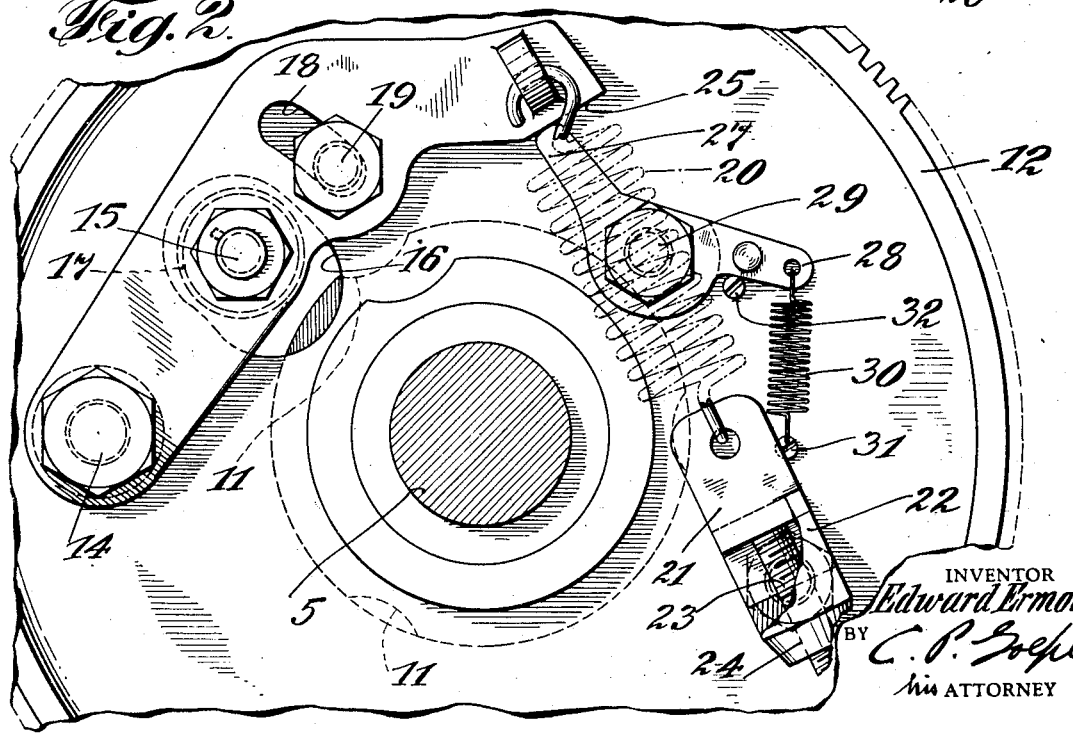
INVENTOR
Edward Ermold
BY
his ATTORNEY

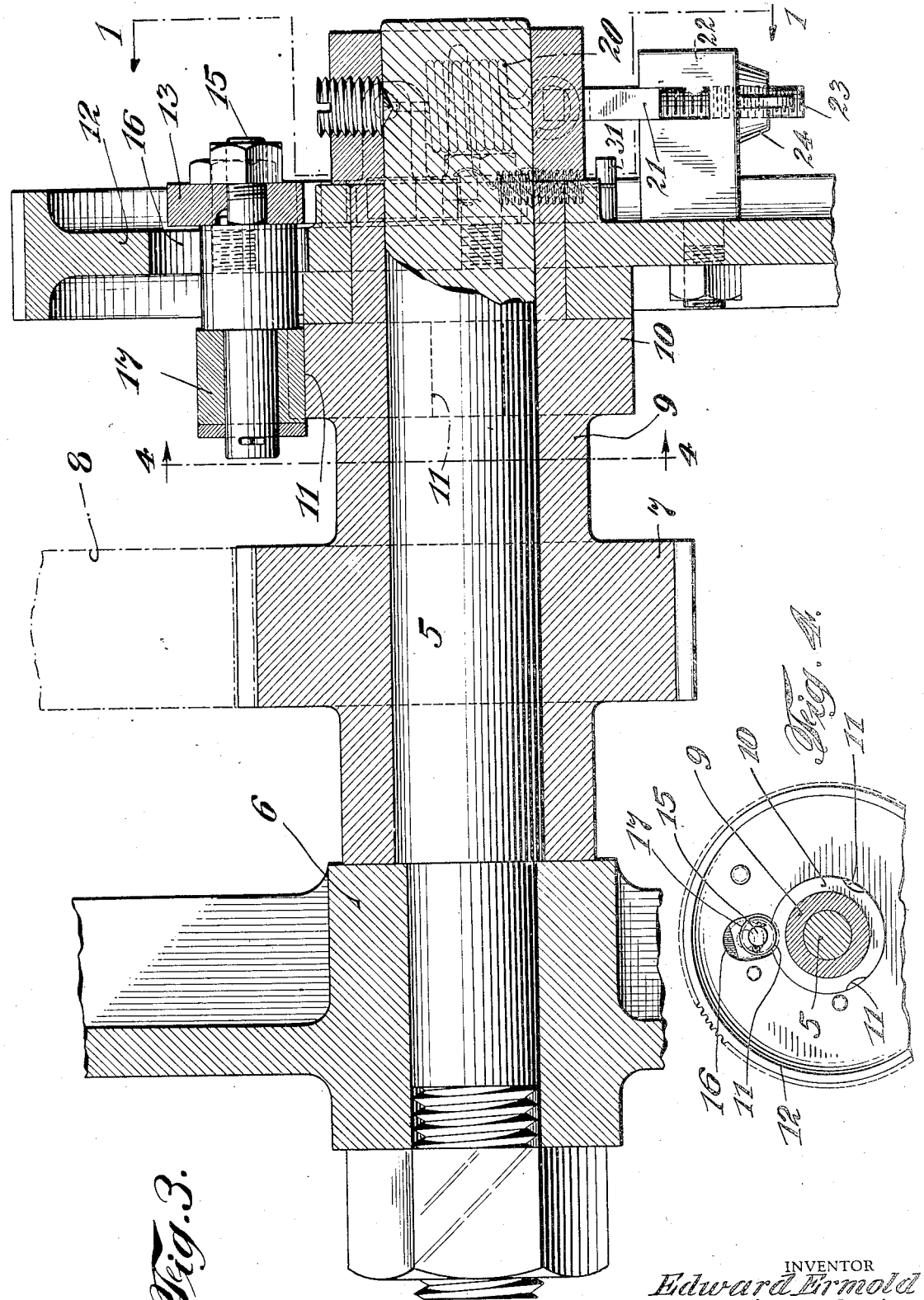

Patented Mar. 12, 1929.

1,705,047

UNITED STATES PATENT OFFICE.

EDWARD ERMOLD, OF NEW YORK, N. Y.

AUTOMATIC OVERLOAD CLUTCH.

Application filed April 2, 1927. Serial No. 180,437.

This invention relates to an automatic overload clutch, and has for its primary object to provide simple and effective means automatically operative when an overload is placed upon a machine to disconnect the machine from a power actuated driving member, and thereby prevent possible injury to the mechanism.

More particularly, the invention has for an important object to provide an improved mounting and arrangement of a movable clutch member upon a driving gear or sprocket for cooperation with a complementary clutch part on a driven member whereby power is transmitted to the machine to be actuated to normally connect said driving and driven members for rotation as a unit, and additional means on the driving wheel for retaining the clutch member in its releasing position to permit of independent relative rotation of the driving wheel or gear and the driven gear.

It is also a further object of the invention to provide an automatic safety clutch of the above character which is simple in the construction and relative arrangement of its several parts, positive and reliable in its operation and may be constructed and applied to various machines at comparatively small cost.

With the above and other objects in view, the invention consists in the improved automatic overload clutch and in the form, construction and relative arrangement of its several parts as will be hereinafter more fully described, illustrated in the accompanying drawings, and subsequently incorporated in the subjoined claim.

In the drawings, wherein I have disclosed one simple and practical embodiment of the invention, and in which similar reference characters designate corresponding parts throughout the several views,—

Figure 1 is a sectional view taken substantially on the line 1—1 of Fig. 3, showing the driving member or gear provided with my improved clutch means showing the latter in its normal position;

Fig. 2 is a similar view, showing the movable clutch member in its released position;

Fig. 3 is a longitudinal sectional view taken substantially on the line 3—3 of Fig. 1, and Fig. 4 is a sectional view on a reduced scale taken on the line 4—4 of Fig. 3.

Referring in detail to the drawings, 5 designates a shaft or arbor suitably mounted and rigidly fixed in the frame structure indicated at 6. Upon the shaft 5, the driven gear 7 is loosely mounted, said gear adapted for meshing engagement with a power transmission gear of the machine to be operated, such transmission gear being indicated in dotted lines at 8. A hub extension 9 of the gear 7 is formed intermediate of its ends with a flange 10 which is provided in its periphery at suitably spaced points with the recesses or seats 11, the purpose of which will hereinafter appear.

Upon the end of the hub extension 9 of the driven gear 7, a driving gear or sprocket wheel as indicated at 12 is losely mounted and is adapted to be suitably connected with a motor or other convenient source of power. Upon one side of the gear wheel 12 and adjacent its outer edge the lever 13 is pivotally mounted at one of its ends as at 14. To this lever intermediate of its ends a pin or stud 15 is suitably fixed and extends through a radially disposed slot or opening 16 in the web of the wheel 12. Upon the other end of this pin 15 the roller 17 is rotatably mounted and is adapted for seating engagement in any one of the recesses 11 in the flange 10. In spaced relation to this pin 15, the lever 13 is provided with a slot 18 concentric with the pivot 14 to receive the guide pin or stud 19 fixed to the wheel 12. To the other end of the lever 13 one end of a coil spring 20 is suitably attached, the other end of said spring being connected to a member 21 adjustably mounted in a bracket 22 fixed to the wheel 12, said member having a threaded shank 23 upon which the adjusting nut 24 bearing against one side of said bracket is engaged. By adjustment of the member 21, the tension of spring 20 can be regulated so as to maintain the requisite pressure of the clutch element or roller 17 upon the flange 10 of the driven gear 7. This end of the lever 13 is also provided on the inner edge thereof with a cam surface indicated at 25 and with this surface, the finger 27 of a pivoted dog 26 cooperates. To the arm 28 projecting from the opposite side of the pivot 29 of said dog 26 one end of a spring 30 is attached, the other end of said spring being secured as at 31 to the wheel or gear 12. A stop screw or pin 32 fixed to said wheel is adapted for engagement by the arm 28 to limit the pivotal movement of the dog 26 under the action of the spring 30, Assuming that the parts are in the position shown in Figs. 1 and 3 of the drawings, it will be evident that when the driving member 12 is rotated, the clutch member 17 being held in one of the seats 11 by the spring 20, the driven member 7 is rotated as a unit therewith to transmit power through the gear 8 to the machine. Should an overload be placed upon the machine being operated so as to retard rotation of the driven gear 7, as the driving gear 12 is being rotated at a relatively higher speed, the clutch roller 17 will instantly ride out of the seat 11 in flange 10 and with the addition of the centrifugal force due to the location of pivot 14, the action of spring 20 is overcome, the lever and clutch roller moving to substantially the position shown in Fig. 2 of the drawings. In this movement of the lever, the finger 27 of the dog 26 rides upon the cam edge 25 of the lever and beyond the same, the spring 30 contracting until the arm 28 engages the stop pin 32 and the finger 27 is positioned substantially at right angles to the edge of the lever. Thus, this dog holds the clutch lever and roller in the position shown in Fig. 2 against the contracting action of spring 20 so that the driving gear or wheel 12 may continue to rotate freely relative to the driven gear 7. By thus automatically disconnecting the machine being operated from the driving gear, the possibility of serious damage to the gearing in the case of overload being placed upon the machine is avoided. When the dog 26 is returned to substantially the position of Fig. 1, the spring 20 immediately contracts so that the clutch roller 17 again bears on the flange 10 and in the rotation of the gear or wheel 12 will seat in one of the notches or recesses 11 to thereby again connect said driving gear with the driven gear 7.

From the foregoing description considered in connection with the accompanying drawings, the construction, manner of operation and several advantages of my improved automatic safety overload clutch will be clearly and fully understood. It will be apparent that such a device is readily adaptable for use in connection with the drive gearing for various different kinds of machines and is positive and reliable in its action to effect the disconnection of the machine from the driving gear upon the occurrence of an overload. I have shown a mounting and arrangement of the several parts of the clutch in connection with the driving gear which I have found to be reliable and satisfactory in practical operation. Nevertheless, it will be understood that the form, construction and relative arrangement of the several elements employed might be suitably varied, and I therefore, reserve the privilege of resorting to all such legitimate changes therein as may be fairly embodied within the spirit and scope of the invention as claimed.

I claim:

In a power transmission mechanism, the combination of a driven member and a driving member, one of said members having a hub formed at its periphery with a curved notch, and the other of said members having a web formed with a guide slot; a main lever pivoted at one end to the web; a roller rotatably secured to said main lever intermediate the ends thereof; a guide member secured to the lever and projecting through the guide slot of the web; a spring attached at one end to the web and at its other end to the main lever, for normally holding the main lever in a position with the roller engaged in the notch, but adapted to yield when an excessive torque is encountered between the driven and driving members to permit the roller to ride out of the notch; a latching lever having an inner and an outer arm, said latching lever being pivoted intermediate its arms to the web, the inner arm being adapted to move under an end of the main lever when the main lever is moved to a position with the roller out of engagement with the notch, to lock the main lever in such position, the outer arm of the latching lever being adapted to afford sufficient leverage to facilitate releasing the latch from locking position; a spring having one end connected to the outer arm of the latching lever and its other end connected to the web; and a stop for limiting the movement of the latching lever in one direction.

In testimony that I claim the foregoing as my invention, I have signed my name hereto.

EDWARD ERMOLD.